(12) United States Patent
Maon et al.

(10) Patent No.: US 9,276,819 B2
(45) Date of Patent: Mar. 1, 2016

(54) NETWORK TRAFFIC MONITORING

(75) Inventors: Sigal Maon, Yehud (IL); Lior Manor, Yehud (IL)

(73) Assignee: Hewlett Packard Enterprise Development LP, Houston, TX (US)

(*) Notice: Subject to any disclaimer, the term of this patent is extended or adjusted under 35 U.S.C. 154(b) by 261 days.

(21) Appl. No.: 13/482,066

(22) Filed: May 29, 2012

(65) Prior Publication Data
US 2013/0322266 A1 Dec. 5, 2013

(51) Int. Cl.
*H04L 12/26* (2006.01)
*H04L 12/24* (2006.01)

(52) U.S. Cl.
CPC ............ *H04L 41/14* (2013.01); *H04L 43/028* (2013.01); *H04L 43/062* (2013.01); *H04L 43/18* (2013.01)

(58) Field of Classification Search
None
See application file for complete search history.

(56) References Cited

U.S. PATENT DOCUMENTS

| | | | |
|---|---|---|---|
| 6,343,320 B1 * | 1/2002 | Fairchild | H04L 41/0213 709/224 |
| 7,464,407 B2 * | 12/2008 | Nakae et al. | 726/22 |
| 7,587,759 B1 | 9/2009 | McArdle et al. | |
| 7,606,147 B2 | 10/2009 | Luft et al. | |
| 8,090,836 B1 * | 1/2012 | Bean et al. | 709/227 |
| 2002/0085555 A1 * | 7/2002 | Jung | H04L 67/14 370/389 |
| 2005/0073982 A1 * | 4/2005 | Corneille et al. | 370/338 |
| 2009/0307533 A1 * | 12/2009 | Niikkonen | G06F 11/0781 714/45 |
| 2009/0328192 A1 * | 12/2009 | Yang et al. | 726/15 |
| 2010/0034102 A1 | 2/2010 | Wang et al. | |
| 2010/0094990 A1 | 4/2010 | Ben-Yehuda et al. | |
| 2010/0125661 A1 * | 5/2010 | Perala | G06F 15/173 709/224 |
| 2010/0128615 A1 | 5/2010 | Monk et al. | |
| 2011/0019574 A1 | 1/2011 | Malomsoky et al. | |
| 2012/0030750 A1 * | 2/2012 | Bhargava | H04L 63/02 726/13 |
| 2012/0054324 A1 * | 3/2012 | Tada | H04L 12/66 709/223 |

* cited by examiner

*Primary Examiner* — Kwang B Yao
*Assistant Examiner* — Hardikkumar Patel
(74) *Attorney, Agent, or Firm* — Hewlett Packard Enterprise Patent Department

(57) ABSTRACT

A network traffic monitoring method includes generating packet information for packets destined for a target subnet. The method includes identifying network connections associated with an application running on a device based on socket activities performed by the application. The method further includes filtering out network traffic information between the application and the target subnet based on the identified network connections and the packet information.

15 Claims, 7 Drawing Sheets

NETWORK TRAFFIC MONITORING

BACKGROUND

Network traffic monitoring is important in network management to accurately investigate and fix network issues, to accurately estimate cost of applications running on the network, and to efficiently allocate network resources (e.g., bandwidth). For example, with the emergence of cloud computing, an important element in calculating or estimating cloud cost is an amount of network traffic attributed to a particular cloud based application. Accordingly, to accurately measure network traffic generated by an application, it would be desirable to capture all network connections and traffic generated by the application communicating with subnets in the network and to determine a direction of the traffic.

DETAILED DESCRIPTION

Introduction

Figure 1:
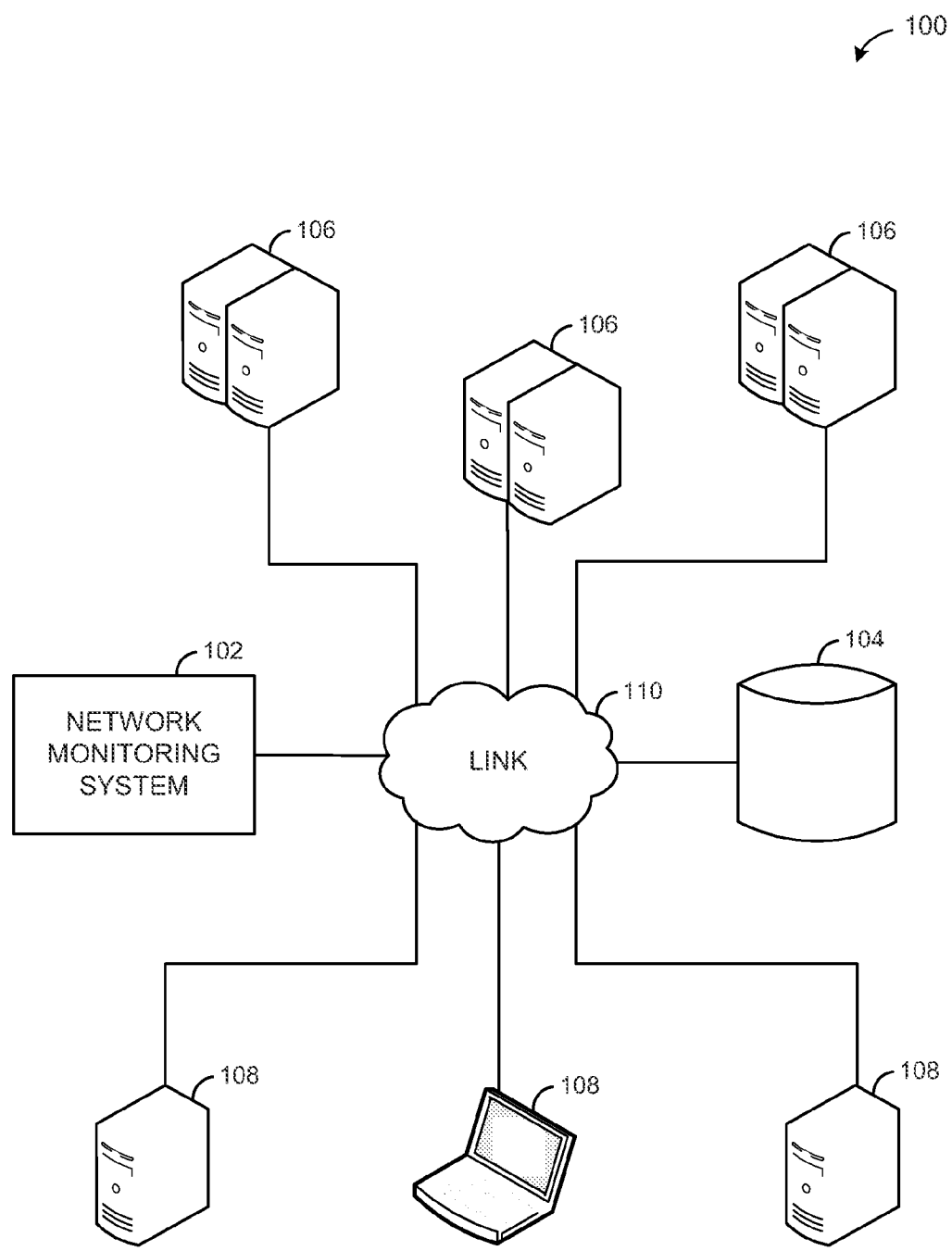
FIG. 1 depicts an environment in which various embodiments may be implemented.

Various embodiments described below were developed to monitor network traffic between a particular application and a target subnet. A device may run several applications, including sub-processes of the application, which use the network. For example, the device may be a notebook computer, a desktop computer, a laptop computer, a handheld computing device, a mobile phone, a server, a slate or tablet computing device, a portable reading device, or any other processing device. The applications may communicate with one or more subnets to exchange data packets thus generating network traffic. Estimating an amount of network traffic between a particular application (e.g., an application of interest) and a target subnet (e.g., a subnet of interest) is challenging due to the lack of network traffic tools to combine network information from the particular application and the target subnet. For example, one tool may be used for capturing network information for the application and another tool may be used for capturing network information for the target subnet, and a network administrator or a user may be required to combine the information to generate the desired network information between the application and the target subnet. This is indeed more difficult when the application communicates with several subnets and especially on short connections. Moreover, such short connections opened by the applications may be missed by application network traffic tools.

In an example implementation developed to monitor network traffic between a particular application and a target subnet, packet information is generated for packets destined for the target subnet. Packet information may include packet header information and packet size information. Network connections associated with an application running on a device may be identified based on socket activities performed by the application. Such socket activities may include socket creation and socket deletion performed by the application and, by sub-processes of the application. The generation of the packet information and the identification of the network connections may be performed in at least substantial concurrence. By generating the packet information and identifying network connections substantially concurrently, performance the network monitoring system is improved as the required information for monitoring network traffic between the particular application and the target subnet may be available at substantially the same time. Based on the identified network connections and the generated packet information, network traffic information between the application and the target subnet is filtered out. The network traffic information provides information regarding an amount of network traffic between the application and the target subnet and a direction of the network traffic (i.e., sent and received). This information, for example, may be used to estimate the expected cost of a specific application independently of other applications running on the same device and may be useful in cloud migration and application regression. Further, the information may be used to improve network performance and to investigate network issues. In addition, the information combines network traffic information for the application with network traffic information for a target subnet and filters out one-to-one network information between the application and the target subnet.

The following description is broken into sections. The first, labeled "Environment," describes an example of a network environment in which various embodiments may be implemented. The second section, labeled "Components," describes examples of physical and logical components for implementing various embodiments. The third section, labeled "Operation," describes steps taken to implement various embodiments.

Environment

FIG. 1 depicts an environment 100 in which various embodiments may be implemented. Environment 100 is shown to include network monitoring system 102, data store 104, server devices 106, and client devices 108. Network monitoring system 102, described below with respect to FIGS. 2A, 2B, 3, and 4, represents generally any combination of hardware and programming configured to monitor network traffic between an application and a target subnet. Data store 104 represents generally any device or combination of devices configured to store data for use by network monitoring system 102. Such data may include packet information data (e.g., packet size, packet header), socket activity data e.g., socket creation and socket deletion), and network traffic information.

Figure 5:
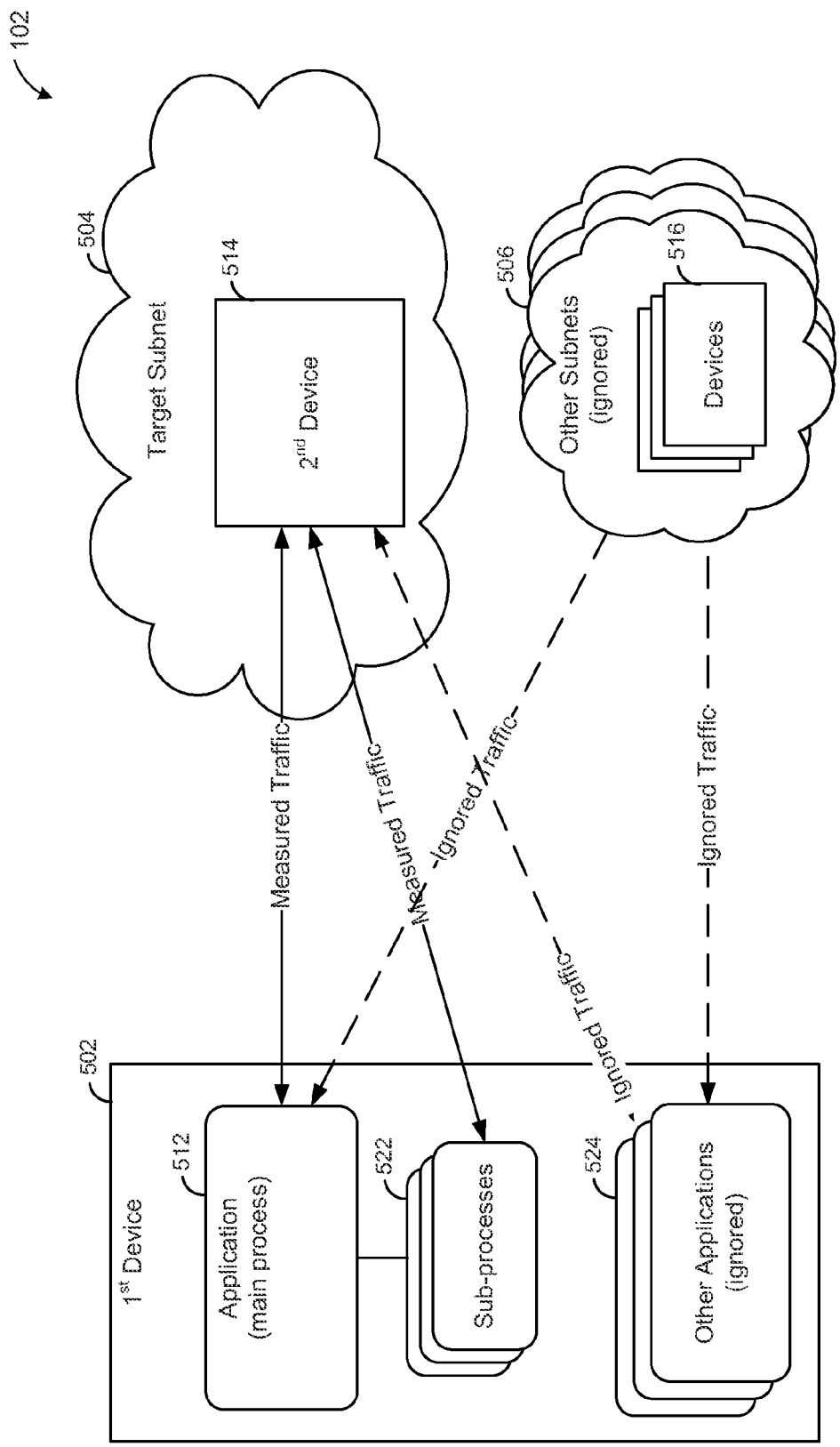
FIG. 5 is a block diagram depicting an example implementation of the system of FIGS. 2A and 2B.

In the example of FIG. 1, client devices 108 may run multiple applications and may communicate with server devices 106 located in multiple subnets. FIG. 5 depicts an example of network traffic (and direction of the traffic) that may be monitored. Server devices 106 represent generally any computing devices configured to respond to network requests received from client devices 108. A given server device 106 may include a web server, an application server, or a data server. Client devices 108 represent generally any computing devices configured with browsers or other applications to communicate such requests and receive and process the corresponding responses. Link 110 represents generally one or more of a cable, wireless, fiber optic, or remote connections via a telecommunication link, an infrared link, a radio frequency link, or any other connectors or systems that provide electronic communication. Link 110 may include, at least in part, an intranet, the Internet, or a combination of both. Link 110 may also include intermediate proxies, routers, switches, load balancers, and the like.

Components

Figure 2A:
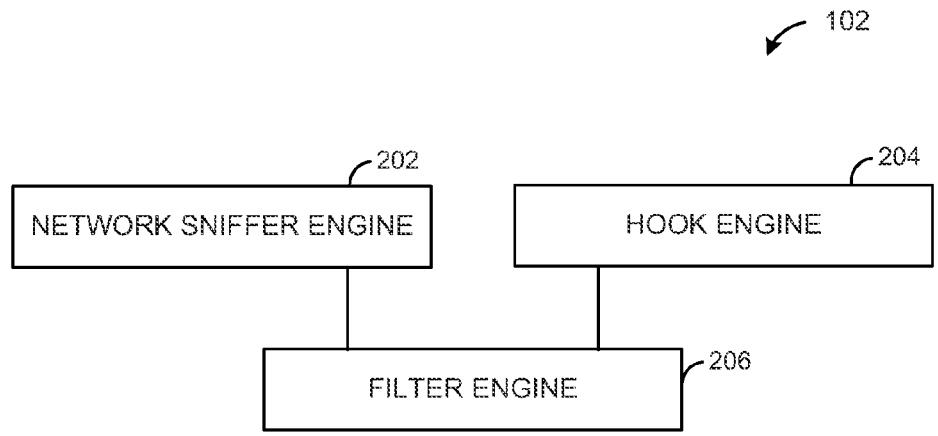
FIGS. 2A and 2B depict a system for monitoring network traffic according to an example.

FIGS. 2A-4 depict examples of physical and logical components for implementing various embodiments. FIG. 2A depicts network monitoring system 102 including network sniffer engine 202, hook engine 204, and filter engine 206. Although not shown in FIG. 2A, network monitoring system 102 may be in communication with data store 108, in one example. In another example, network monitoring system 102 may include the data store 108.

Network sniffer engine 202 represents generally any combination of hardware and programming configured to generate packet information for packet traffic to a target subnet. A network sniffer or packet analyzer may intercept and traffic passing aver the network or a part of the network. For example, the network monitoring system 102 via the network sniffer engine 202 may add a network sniffer to a device running a plurality of applications including an application of interest. The network sniffer captures and saves packet information for all traffic on the device. The network sniffer may decode each packet's data and analyze the contents to extract packet information like packet header and packet size, for example. Further, the network sniffer may categorize the packet information based on subnets. For example, the packet information may be saved according to subnets (e.g., in data store 108).

To illustrate, if the device communicates with multiple subnets in the network, the network sniffer may save packet information for each individual subnet together (i.e., packet information may be categorized by subnet). Accordingly, packet information for packet traffic to a particular subnet may be easily generated. For example, packet information corresponding to packet traffic sent to a target subnet may be generated from packet information available. Thus, network sniffer engine 202 may operate to monitor packet traffic between a device and a plurality of subnets, extract packet information for packets sent to the plurality of subnets, and generate packet information for packet traffic to a target subnet.

Hook engine 204 represents generally any combination of hardware and programming configured to identify network connections associated with an application running on a device based on socket activities of the application. It should be noted that the hook engine 204 may run in parallel with or at least substantially concurrently with the network sniffer engine 202. Hook engine 204 may alter or augment execution of the application (e.g., by inserting breakpoint triggers) to identify when socket activities are performed by the application. Socket activities may include socket creation and socket deletion. Further, socket activities may include socket activities performed by sub-processes of the application.

For example, the hook engine 204 determines when the application opens or closes a transmission control protocol (TCP) connection. The hook engine 204 captures all connections by the application, including short network connections. Based on the socket activities of the application, the hook engine 204 is able to identify network connections associated with the application. Thus, the hook engine 204 may operate to insert breakpoint triggers into an application, the breakpoint triggers to detect socket activities performed by the application, and to identify network connections associated with the application based on the socket activities.

Filter engine 206 represents generally any combination of hardware and programming configured to filter out network traffic information between the application and the target subnet based on the identified network connections and packet information corresponding to the target subnet. Filter engine 206 may concurrently receive output data from network sniffer engine 202 and hook engine 204. Filter engine 206 may receive, from network sniffer engine 202, data representing packet information corresponding to packet traffic to the target subnet and may receive, from hook engine 204, data representing identified network connections associated with a particular application. Based on the received data from network sniffer engine 202 and hook engine 204, filter engine 206 may filter out network traffic information between the application and the target subnet.

The network traffic information includes an amount of network traffic between the application and the target subnet. For example, the filter engine 206 may aggregate the amount of traffic that has passed between the application and the target subnet. Further, the filter engine 204 identifies the amount of traffic by direction. For example, the filter engine 204 identifies an amount of outgoing traffic from the application to the target subnet (i.e., packets sent) and an amount of incoming traffic from the target subnet to the application (i.e., packets received).

Figure 2B:
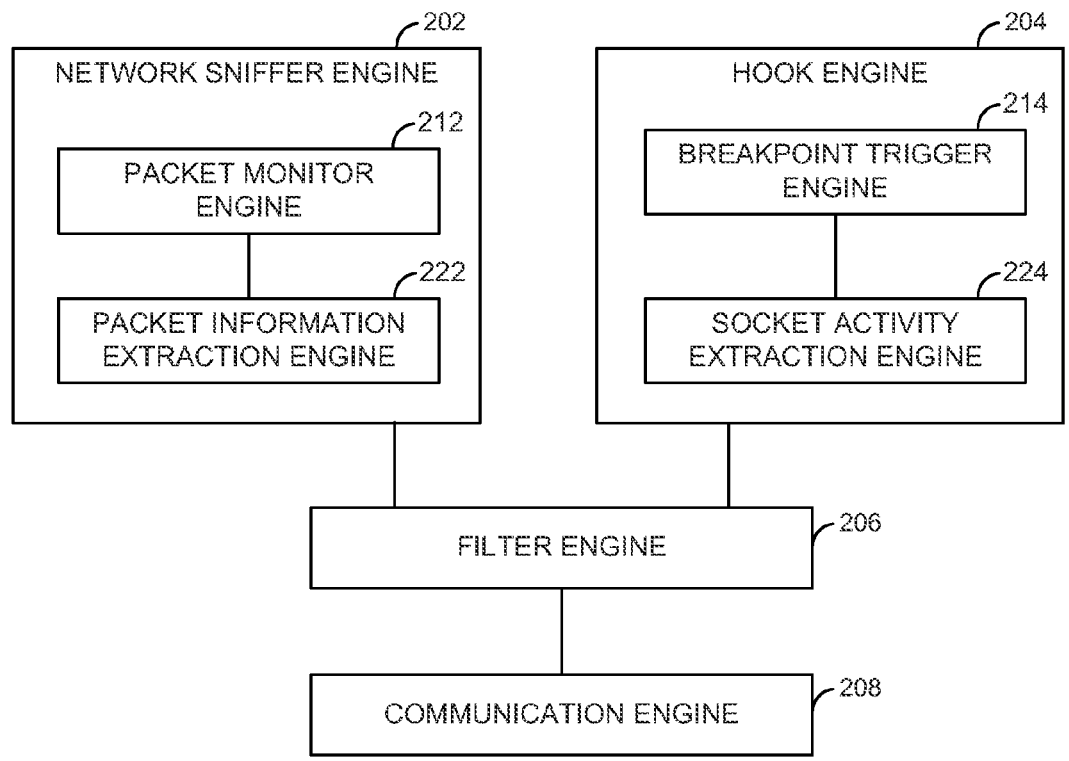

FIG. 2B depicts network monitoring system 102 including network sniffer engine 202, hook engine 204, filter engine 206, and communication engine 208. In the example of FIG. 2B, network sniffer engine 202 may include packet monitor engine 212 and packet information extraction engine 222. Further, hook engine 204 may include breakpoint trigger engine 214 and socket activity extraction engine 224.

Packet monitor engine 212 represents generally any combination of hardware and programming configured to monitor packet traffic between a device and a plurality of subnets. For example, packet monitor engine 212 may, in real-time, capture data packets communicated between the device and one or more subnets in the network. The data packets may include header and payload. The packet monitor engine 212 may be configured to capture every data packet sent from the device and every data packet received at the device, such that no data packet is missed. The captured data packets may be saved (e.g., in data store 108) for inspection and analysis by the packet information extraction engine 222, for example. Further, the captured data packets may be categorized and stored by subnets.

Packet information extraction engine 222 represents generally any combination of hardware and programming configured to extract packet information for packets sent from the device to the plurality of subnets. For example, the packet information extraction engine 222 may be configured to analyze the captured data packets between the device and the plurality of subnets. Packet information extraction engine 222 may analyze (e.g., decode) the header and payload of the captured data packets. Accordingly, the packet information extraction engine 222 is able to extract packet information like packet header and packet size for each of the captured data packets. Further, the extracted packet information may be stored and categorized by subnets. Based on the extracted packet information, the network sniffer engine 202 may generate packet information for packet traffic to any of the plurality of subnets or to a particular subnet of interest (i.e., a target subnet).

As described above, the hook engine 204 may include breakpoint trigger engine 214 and socket activity extraction engine 224. Breakpoint trigger engine 214 represents generally any combination of hardware and programming configured to insert breakpoint triggers into an application running on the device, for example. The breakpoint triggers may be to detect socket activities performed by the application and sub-processes of the application. For example, the breakpoint trigger engine 214 may insert breakpoint triggers to alter execution of the application such that control of execution of the application is transferred to the breakpoint trigger engine 214 to detect when the application and sub-processes perform socket activities. Accordingly, the breakpoint trigger engine 214 detects every socket activity performed by the application, including short connections.

Socket activity extraction engine 224 represents generally any combination of hardware and programming configured to extract socket activity information for the application. For example, when a socket activity is detected by the breakpoint activity engine 214, the socket activity extraction engine 224 may extract socket information (i.e., record the socket information). The socket activity information may include information regarding socket creation and socket deletion and the socket activity time (e.g., socket creation time and socket deletion time). Based on the socket activity information, the hook engine 204 may identify network connections associated with the application.

As described above, filter engine 206 represents generally any combination of hardware and programming configured to filter out network traffic information between the application and the target subnet, based on outputs provided by the network sniffer engine 202 and the hook engine 204. For example, filter engine 206 may receive, from the network sniffer engine 202, packet information for packet traffic to a target subnet and may substantially concurrently receive, from the hook engine 204, information regarding network connections associated with the application. Filter engine 206 may filter out the network traffic information between the application and the target subnet from the packet information and the network connections information.

Communication engine 208 represents generally any combination of hardware and programming configured to communicate the network traffic information. For example, the communication engine 208 may be configured to cause a display of the network traffic information (e.g., on a display device), send an electronic message including the network traffic information, or a combination thereof. Accordingly, a network administrator may be provided with the network traffic information between an application of interest and a target subnet to enable performance of accurate cost estimation of the application, cloud migration, application regression, to improve network performance, and to investigate network issues. The network traffic information may further be filtered by sub-processes of the application and may include a count of the network traffic filtered by direction. For example, the network traffic information may include a count of outgoing network traffic from the application to the target subnet and a count of incoming network traffic from the target subnet.

In foregoing discussion, engines 202-206 of FIG. 2A were described as combinations of hardware and programming. Such components may be implemented in a number of fashions. Looking at FIG. 3, the programming may be processor executable instructions stored on tangible, non-transitory computer-readable storage medium 302 and the hardware may include processor 304 for executing those instructions. Processor 304, for example, can include one or multiple processors. Such multiple processors may be integrated in a single device or distributed across devices. Computer-readable storage medium 302 can be said to store program instructions that when executed by processor 304 implements system 102 of FIG. 2A. Medium 302 may be integrated in the same device as processor 304 or it may be separate but accessible to that device and processor 304.

In one example, the program instructions can be part of an installation package that when installed can be executed by processor 304 to implement system 102. In this case, medium 302 may be a portable medium such as a CD, DVD, or flash drive or a memory maintained by a server from which the installation package can be downloaded and installed. In another example, the program instructions may be part of an application or applications already installed. Here, medium 302 can include integrated memory such as hard drive, solid state drive, or the like.

Figure 3:
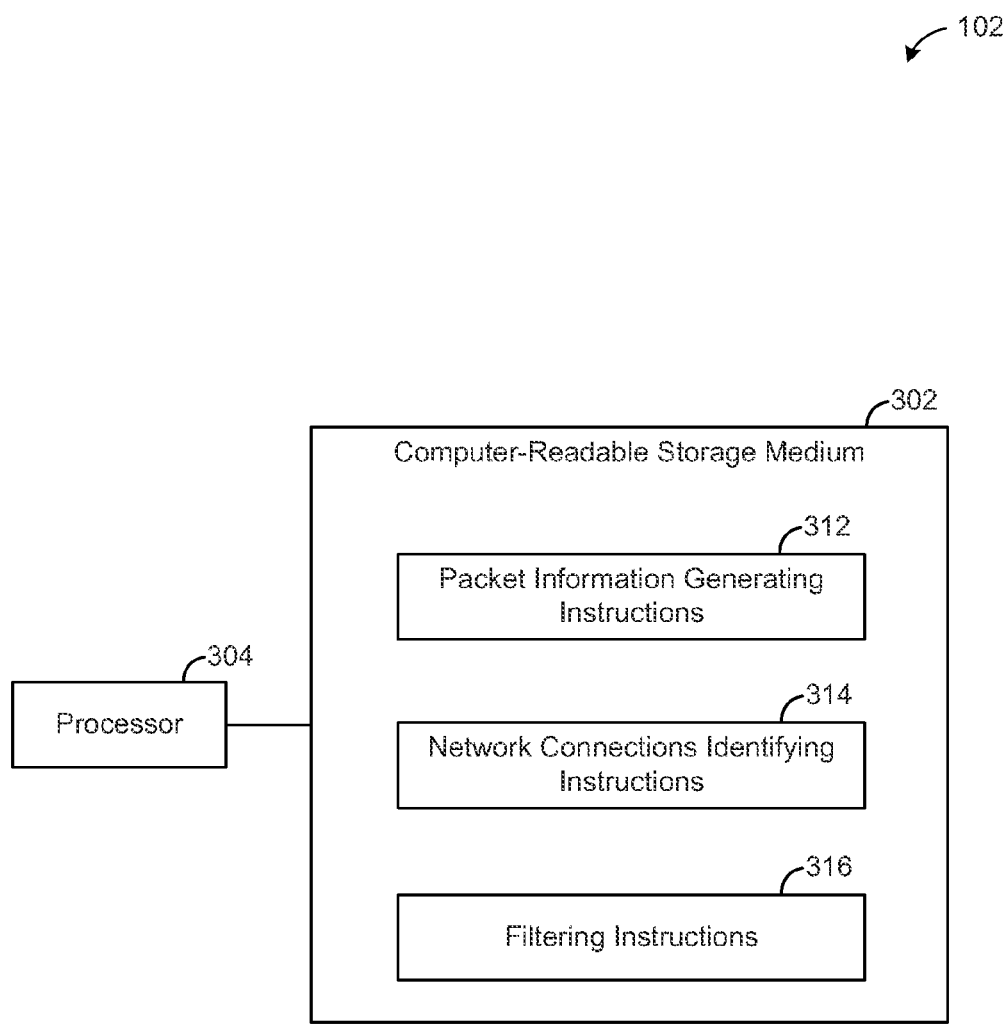
FIG. 3 is a block diagram depicting an example implementation of a processor and a machine-readable storage medium encoded with instructions for monitoring network traffic.

In FIG. 3, the executable program instructions stored in medium 302 are represented as packet information generating instructions 312, network connections identifying instructions 314, and filtering instructions 316 that when executed by processor 304 implement network monitoring system 102 (FIG. 2A). Packet information generating instructions 312 represent program instructions that when executed function as network sniffer engine 202. Network connections identifying instructions 314 represent program instructions that when executed implement hook engine 204. Filtering instructions 316 represent program instructions that when executed implement filter engine 206.

Figure 4:
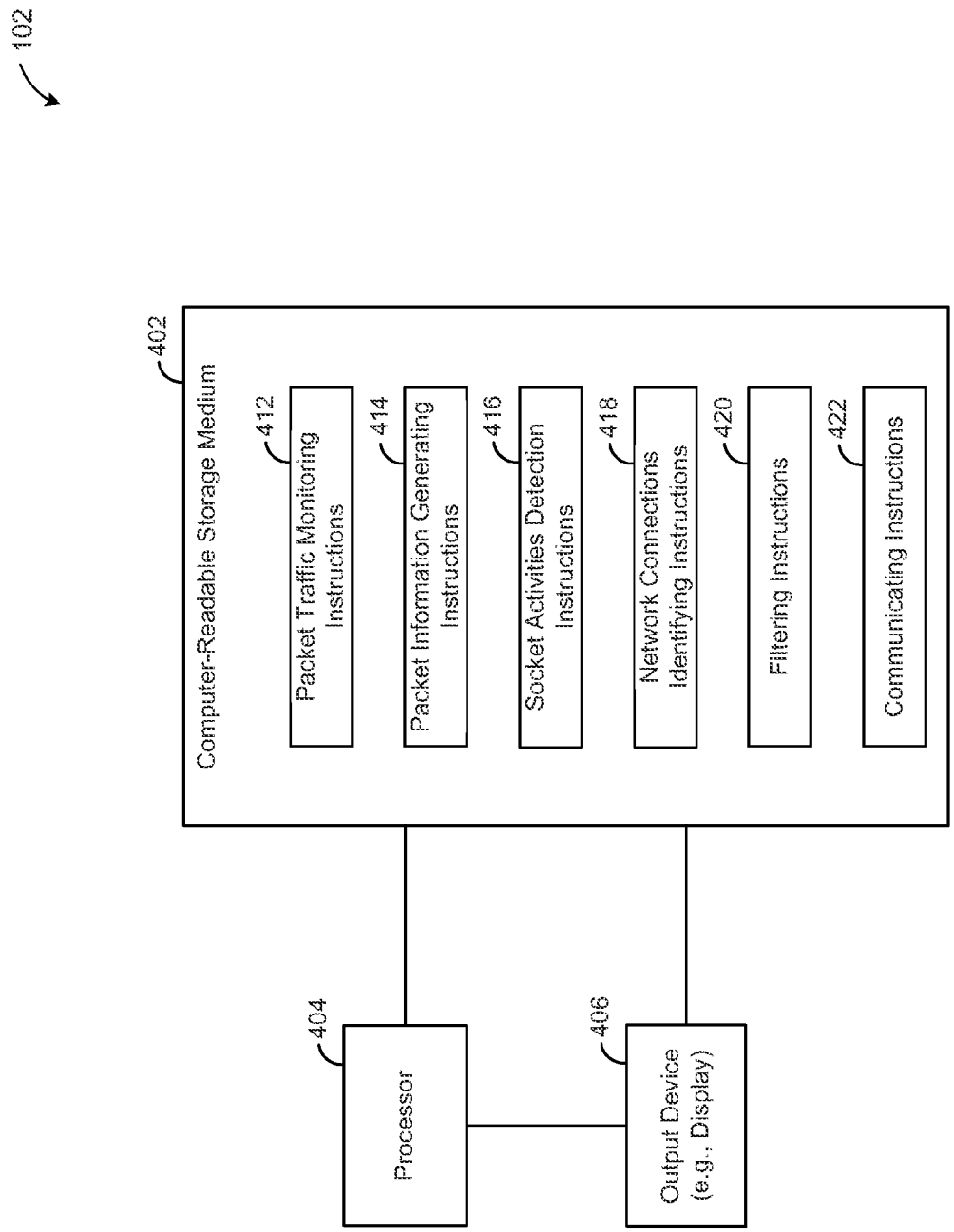
FIG. 4 is a block diagram depicting another example implementation of a processor and a machine-readable storage medium encoded with instructions for monitoring network traffic.

In foregoing discussion, engines 202-208 of FIG. 2B were described as combinations of hardware and programming. Such components may be implemented in a number of fashions. Looking at FIG. 4, the programming may be processor executable instructions stored in tangible, non-transitory computer-readable storage medium 402 and the hardware may include processor 404 for executing those instructions. FIG. 4 also includes output device 406 (e.g., a display) for displaying output generated by execution of the instructions. Processor 404, for example, can include one or multiple processors. Such multiple processors may be integrated in a single device or distributed across devices. Medium 402 can be said to store program instructions that when executed by processor 404 implements system 102 of FIG. 2B. Medium 402 may be integrated in the same device as processor 404 or it may be separate but accessible to that device and processor 404.

In one example, the program instructions can be part of an installation package that when installed can be executed by processor 404 to implement system 102. In this case, medium 402 may be a portable medium such as a CD, DVD, or flash drive or a memory maintained by a server from which the installation package can be downloaded and installed. In another example, the program instructions may be part of an application or applications already installed. Here, medium 402 can include integrated memory such as hard drive, solid state drive, or the like.

In FIG. 4, the executable program instructions stored in medium 402 are represented as packet traffic monitoring instructions 412, packet information generating instructions 414, socket activities detection instructions 416, network connections identifying instructions 418, filtering instructions 420, and communicating instructions 422 that when executed by processor 404 implement network monitoring system 102 (FIG. 2B). Packet traffic monitoring instructions 412 represent program instructions that when executed implement packet monitor engine 212. Packet information generating instructions 414 represent program instructions that when executed implement packet information extraction engine 222. Socket activities detection instructions 416 represent program instructions that when executed implement breakpoint trigger engine 214. Network connections identifying instructions 418 represent program instructions that when executed implement socket activity extraction engine 224. Filtering instructions 420 represent program instructions that when executed implement filter engine 206. Communicating instructions 422 represent program instructions that when executed implement communication engine 208.

Referring to FIG. 5, an example implementation of the network monitoring system 102 of FIGS. 2A and 2B is shown. In FIG. 5, a first device 502 may include a plurality of applications that communicate over a network. The applications may communicate with one or more devices located in a plurality of subnets. The plurality of applications may include an application of interest, application 512, for example. The plurality of subnets may also include a subnet of interest—target subnet 504, for example. Each subnet of the plurality of subnets may include one or more devices located in the subnet. It may thus be desirable to monitor and measure network traffic between application 512 and a second device 514 located in the target subnet 504.

During implementation of the network monitoring system 102, network traffic between application 512 running on the first device 502 and the second device 514 located in target subnet 504 is measured. In addition, network traffic between sub-processes 522 of the application 512 and the second device 514 in the target subnet 504 is measured. The system 102 may ignore network traffic between the application 512 and devices 516 in other subnets 506. Similarly, network traffic between other applications 524 on the first device and the second device 514 is ignored and network traffic between the other applications 524 and devices 516 in other subnets 506 is ignored.

Operation

Figure 6:
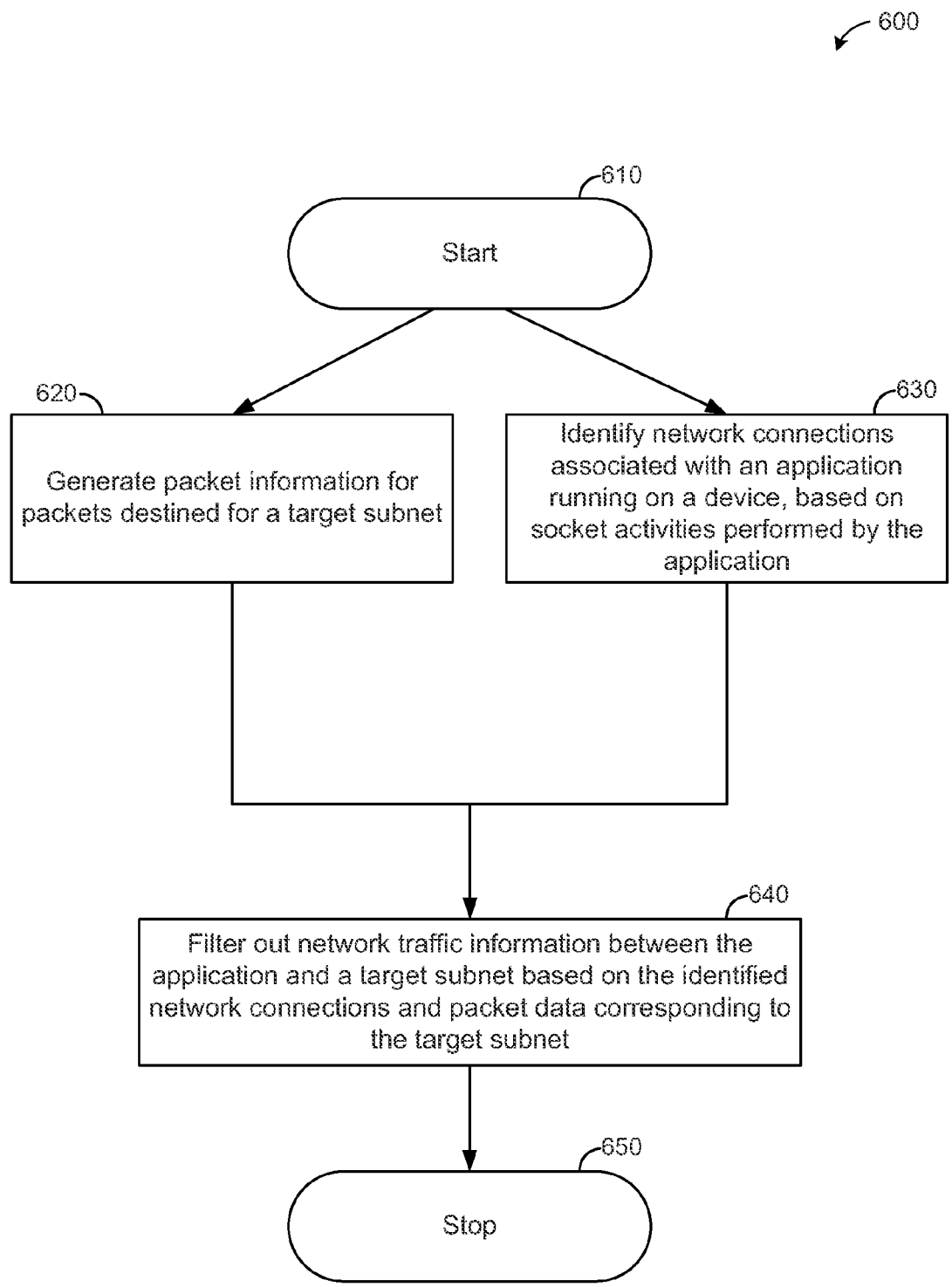
FIG. 6 is a flowchart of an example implementation of a method for monitoring network traffic.
Figure 7:
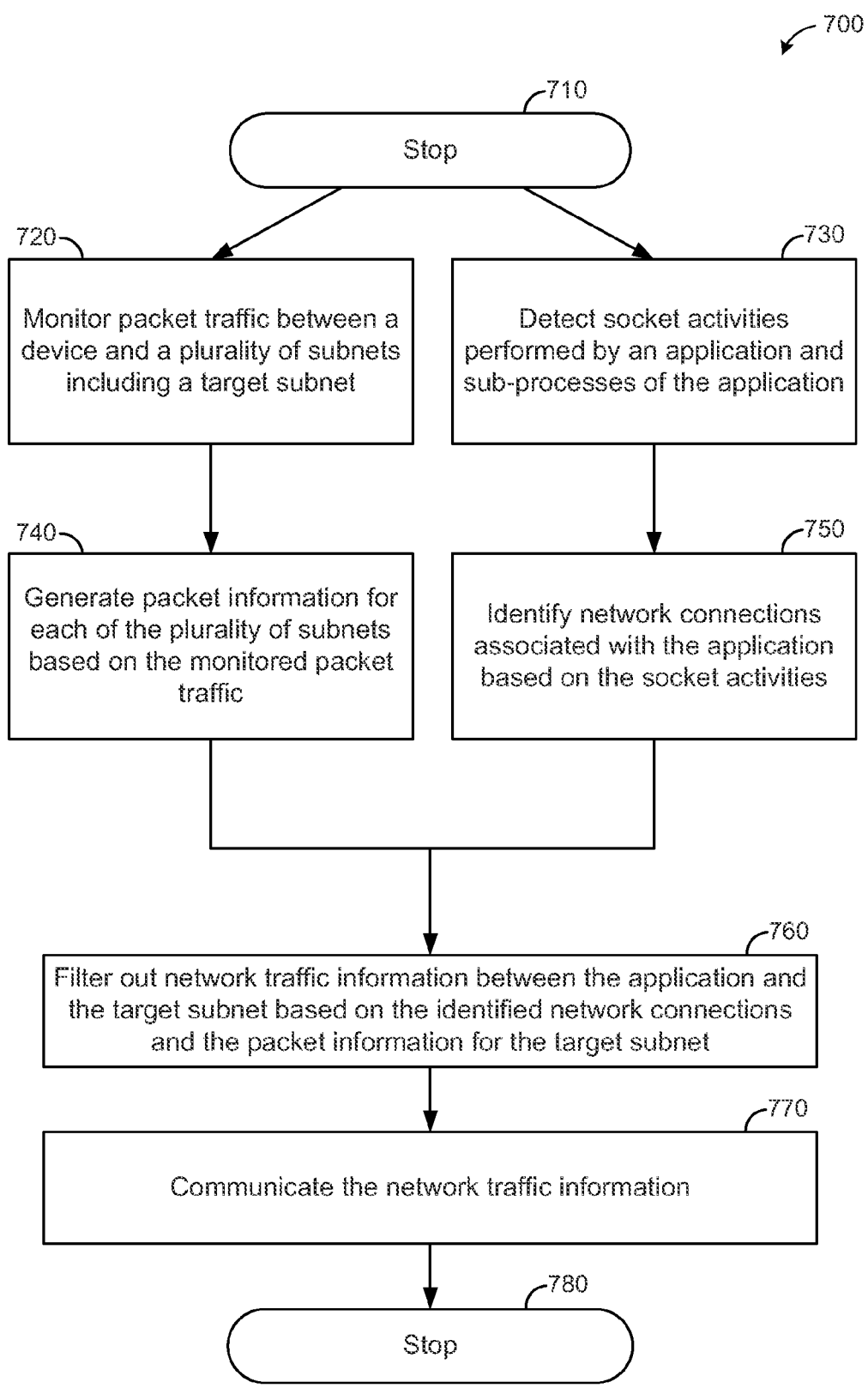
FIG. 7 is a flowchart of another example implementation of a method for monitoring network traffic.

FIGS. 6 and 7 are example flow diagrams of steps taken to implement embodiments of a network traffic monitoring method in discussing FIGS. 6 and 7, reference is made to the diagrams of FIGS. 2A and 2B, respectively, to provide contextual examples. Implementation, however, is not limited to those examples.

Starting with FIG. 6, a flowchart of an embodiment of a method 600 for monitoring network traffic is described. Method 600 may start in step 610 and proceed to step 620, where packet information for packets destined for a target subnet is generated. Referring to FIG. 2A, network sniffer engine 202 may be responsible for implementing step 620. The packet information may include packet header and packet size decoded from packets sent to the target subnet.

Method 600 also includes step 630, where network connections associated with an application running on a device are identified. The network connections may be identified based on socket activities performed by the application. Referring to FIG. 2A, hook engine 204 may be responsible for implementing step 630. For example, hook engine 204 may alter execution of the application to monitor and control execution of the application, such that network connections of the application may be identified. Steps 620 and 630 may be performed in parallel.

Method 600 may proceed to step 640, where traffic information between the application and the target subnet are filtered out based on the identified network connections and the generated packet information. Referring to FIG. 2A, filter engine 206 may be responsible for implementing step 640. For example, the filter engine 206 may receive, from network sniffer engine 202, data representing packet information corresponding to packet traffic to the target subnet and may receive, from hook engine 204, data representing identified network connections associated with the application. Based on the data from network sniffer engine 202 and hook engine 204, filter engine 206 may filter out network traffic information between the application and the target subnet. Method 600 may then proceed to step 650, where the method 600 stops.

FIG. 7 depicts a flowchart of an embodiment of a method 700 for monitoring network traffic. Method 700 may start in step 710 and proceed to step 720, where packet traffic between the device and the plurality of subnets including the target subnet is monitored. Referring to FIG. 2B, packet monitor engine 212 may be responsible for implementing step 720. For example, packet monitor engine 212 may monitor packet traffic between the device and the plurality of subnets, capture the packets, and save the packets, where the packets are categorized by subnets.

Method 700 may proceed to step 740, where packet information for each of the plurality of subnets is generated, based on the monitored packet traffic. Referring to FIG. 2B, packet information extraction engine 222 may be responsible for implementing step 740. For example, packet information extraction engine 222 may analyze and decode the header and payload data of the captured packets to generate packet information. The generated packet information may include packet header information and packet size information for all the packets.

Method 700 also includes steps 730 and 750 which may be performed in parallel with steps 720 and 740, respectively. In step 730, socket activities performed by the application are detected. Socket activities performed by the application also include socket activities performed by sub-processes of the application. Referring to FIG. 2B, breakpoint trigger engine 214 may be responsible for implementing step 730. For example, breakpoint trigger engine 214 may insert breakpoint triggers into the application to detect each time the application performs a socket activity.

Method 700 may proceed to step 750, where network connections associated with the application are identified based on the socket activities. Referring to FIG. 2B, socket activity extraction engine 224 may be responsible for implementing step 750. For example, socket activity extraction engine 224 may extract socket activity information including socket creation and socket deletion. Socket activity information may also include time of socket creation and time of socket deletion. Socket activity extraction engine 224 may identify network connections associated with the application based on the socket activity information.

Method 700 may proceed to step 760, where network traffic information between the application and the target subnet is filtered out. Referring to FIG. 2B, filter engine 206 may be responsible for implementing step 760. For example, the filter engine 206 may filter out network traffic information on the identified network connections and the packet information.

Method 700 may proceed to step 770, where the network traffic information is communicated. Referring to FIG. 2B, communication engine 208 may be responsible for implementing step 770. For example, communication engine 208 may cause the network traffic information to be displayed on a display device or to be sent as an electronic message over the network. Method 700 may then proceed to step 780, where the method 700 stops.

CONCLUSION

FIGS. 1-5 depict the architecture, functionality, and operation of various embodiments. In particular, FIGS. 2-5 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any computer-readable medium for use by or in connection with an instruction execution system such as a computer/processor based system or an ASIC (Application Specific Integrated Circuit) or other system that can fetch or obtain the logic from computer-readable medium and execute the instructions contained therein. "Computer-readable medium" can be any individual medium or distinct media that can contain, store, or maintain a set of instructions and data for use by or in connection with the instructions execution system. A computer-readable medium can comprise any one or more of many physical, non-transitory media such as, for example, electronic, magnetic, optical, electromagnetic, or semiconductor device. More specific examples of a computer-readable medium include, but are not limited to, a portable magnetic computer diskette such as floppy diskettes, hard drives, solid state drives, random access memory (RAM), read-only memory (ROM), erasable programmable read-only memory, flash drives, and portable compact discs.

Although the flow diagrams of FIGS. 6-7 show specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A network traffic monitoring method, comprising:
    generating packet information for packets destined for a target subnet;
    inserting breakpoint triggers into an application to detect socket activities performed by the application and by sub-processes of the application at the target subnet;
    identifying network connections associated with the application running on a device, based on the socket activities performed by the application;
    aggregating an amount of network traffic information by identifying an amount of incoming traffic and an amount of outgoing traffic that has passed between the application and the target subnet based on the identified network connections and the packet information, the aggregating ignoring network traffic between other applications running on the device and devices in other subnets; and
    estimating an expected cost of the aggregated amount of network traffic information attributed to the application and the target subnet.

2. The method of claim 1, further comprising communicating the network traffic information.

3. The method of claim 1, wherein generating the packet information and identifying the network connections occur substantially concurrently.

4. The method of claim 1, wherein generating the packet information comprises:
    monitoring packet traffic between the device and a plurality of subnets including the target subnet; and
    generating packet information for each of the plurality of subnets based on the monitored packet traffic.

5. The method of claim 1, wherein the network traffic information further includes a direction of the network traffic between the application and the target subnet.

6. The method of claim 1, wherein the packet information includes packet header information and packet size information.

7. The method of claim 1, wherein the socket activities include at least one of socket creation and socket deletion.

8. The method of claim 7, wherein the socket activities include at least one of socket creation time and socket deletion time.

9. A non-transitory computer readable medium comprising memory having instructions that, when executed by a processor, cause the processor to:
    generate packet information for packets sent to a target subnet;
    insert breakpoint triggers into an application to detect socket activities performed by the application and by sub-processes of the application at the target subnet;
    identify network connections associated with the application based on socket activities of the application;
    aggregate an amount of network traffic information by identifying an amount of incoming traffic and an amount of outgoing traffic that has passed between the application and the target subnet from the identified network connections and packet information, the aggregating ignoring network traffic between other applications running on the device and devices in other subnets; and
    estimate expected cost of the aggregated amount of network traffic information attributed to the application and the target subnet.

10. The non-transitory computer readable medium of claim 9, wherein the memory further having instructions executable by the processor to:
    monitor packet traffic between a device and a plurality of subnets including the target subnet; and
    generate packet information for each of the plurality of subnets from the monitored network traffic, the generated packet information including packet information associated with the target subnet.

11. The non-transitory computer readable medium of claim 9, wherein the memory further having instructions executable by the processor to communicate the network traffic information.

12. A network traffic monitoring system comprising:
    a network sniffer engine to generate packet information for packet traffic to a target subnet;
    a hook engine to identify network connections associated with an application running on a device based on socket activities of the application by inserting breakpoint triggers into the application to detect socket activities performed by the application and by sub-processes of the application at the target subnet; and a filter engine to aggregate an amount of network traffic information by identifying an amount of incoming traffic and an amount of outgoing traffic that has passed between the application and the target subnet based on the identified network connections and packet information corresponding to the target subnet, the filter engine ignoring network traffic between other applications running on the device and devices in other subnets; and a communication engine to estimate an expected cost of the aggregated amount of network traffic information attributed to the application and the target subnet.

13. The system of claim 12, the network sniffer engine comprising:

a packet monitor engine to monitor packet traffic between the device and a plurality of subnets including the target subnet; and an extraction engine to extract packet information for packets sent to the plurality of subnets including the target subnet.

14. The system of claim 12, the hook engine comprising a socket activity extraction engine to record the detected socket activities.

15. The method of claim 1, further comprising categorizing the packet information based on corresponding subnet, and saving the packet information according to the corresponding subnet.

\* \* \* \* \*